United States Patent [19]

Voellmer

[11] Patent Number: 5,044,063
[45] Date of Patent: Sep. 3, 1991

[54] ROBOTIC TOOL CHANGE MECHANISM

[75] Inventor: George M. Voellmer, Takoma Park, Md.

[73] Assignee: The United States of America as represented by the Administrator of the National Aeronautics and Space Administration, Washington, D.C.

[21] Appl. No.: 608,657

[22] Filed: Nov. 2, 1990

[51] Int. Cl.⁵ .......................................... B23Q 3/155
[52] U.S. Cl. ................................... 29/568; 294/86.4; 901/30
[58] Field of Search ....................... 29/568; 901/30, 31, 901/39, 41; 294/86.4

[56] References Cited

U.S. PATENT DOCUMENTS

| | | |
|---|---|---|
| 4,512,709 | 4/1985 | Hennekes et al. |
| 4,520,550 | 6/1985 | Dunn et al. ........................ 29/568 |
| 4,604,787 | 8/1986 | Silvers, Jr. |
| 4,624,043 | 11/1986 | Bennett |
| 4,635,328 | 1/1987 | Palmer |
| 4,636,135 | 1/1987 | Bancon |
| 4,637,121 | 1/1987 | Wortmann |
| 4,660,274 | 4/1987 | Goumas et al. |
| 4,676,142 | 1/1987 | McCormick et al. |
| 4,706,372 | 11/1987 | Ferrero et al. |
| 4,793,053 | 12/1988 | Zuccaro et al. |
| 4,826,230 | 5/1989 | Truchet |
| 4,852,242 | 8/1989 | Tella et al. |
| 4,875,275 | 10/1989 | Hutchinson et al. ............... 29/568 |
| 4,913,617 | 4/1990 | Nicholson |

FOREIGN PATENT DOCUMENTS 3812527 10/1989 Fed. Rep. of Germany ........ 29/568

Primary Examiner—Daniel W. Howell
Attorney, Agent, or Firm—R. Dennis Marchant; Harold W. Adams; Paul S. Clohan, Jr.

[57] ABSTRACT

An assembly of three major components including a wrist interface plate which is secured to the wrist joint of a robotic arm, a tool interface plate which is secured to each tool intended for use by the robotic arm, and a tool holster for each tool attached to the interface plate. The wrist interface plate and a selected tool interface plate are mutually connectable together through an opening or recess in the upper face of the interface plate by means of a notched tongue protruding from the front face of the wrist interface plate which engages a pair of spring-biased rotatable notched wheels located within the body of the tool interface plate. The tool holster captures and locks onto the tool interface plate by means of a pair of actuation claws including a locking tab and an unlocking wedge which operate respective actuation bosses on each of the notched wheels in response to a forward and backward motion of the tool interface plate as a result of motion of the robotic arm to either park the tool or use the tool.

14 Claims, 3 Drawing Sheets

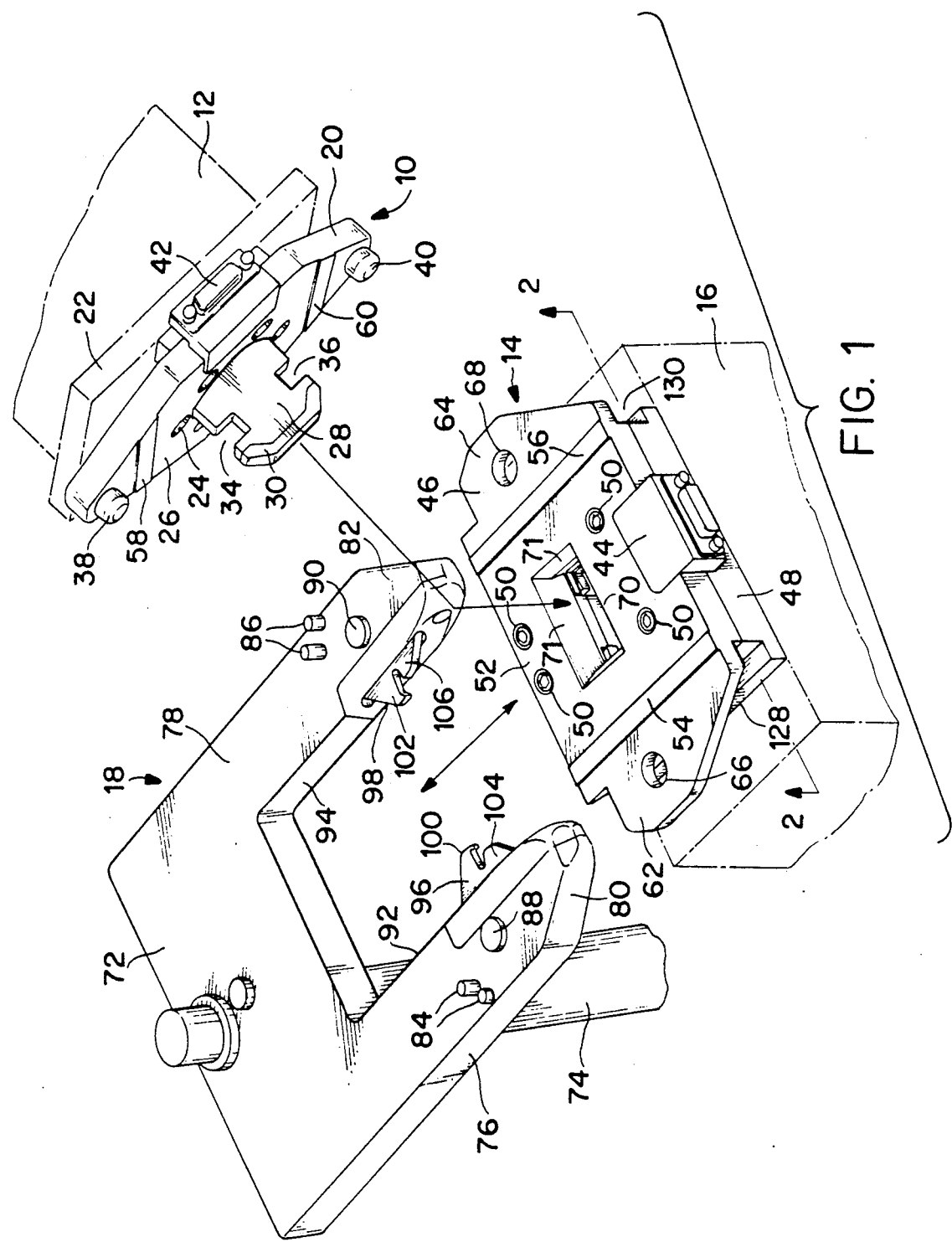

ROBOTIC TOOL CHANGE MECHANISM

ORIGIN OF THE INVENTIOLN

The invention described herein was made by an employee of the United States Government and may be manufactured and used by or for the Government for governmental purposes without the payment of any royalties thereon or therefor.

BACKGROUND OF THE INVENTION

This invention relates generally to robotic tooling systems and more particularly to a passive tool changer which is adapted to permit a robot to change tools autonomously at the wrist joint which generally has a movable end-effector to which is attached a gripper or some other type of tool.

Robotic tool changers are generally known and generally fall into two classes, active and passive. An active type of system typically uses pneumatic or electrical actuators to make or break the connection between the two halves of the tool changer at the wrist joint. One example of this type of system is shown in U.S Pat. No. 4,676,142, entitled, "Adapter With Modular Components For A Robot End-of-Arm Interchangeable Tooling System", P. E. McCormick et al, which issued on June 30, 1987. A passive system, on the other hand, typically uses the robot's wrist motion to actuate an engagement mechanism. An example of this type toolchanger is shown in U.S. Pat. No. 4,512,709 entitled, "Robot Toolchanger System", D. M. Hennekes et al, which issued on Apr. 23, 1985.

Where a robot is intended to be used in zero gravity environments, such as outer space, tool changers which include pneumatic actuators are generally unacceptable. Toolchangers having electric actuators would also be normally unacceptable because large, redundant power trains and motors would result in an unwieldy system. While a passive tool changer such as shown in U.S. Pat. No. 4,512,709 could be utilized, it would inherently require a tool stowage assembly which intrudes significantly into the volume required for the tool, thus putting restrictive limits on tool size and shape. Also it relies on gravity to hold the tool securely in place when not in use, which is not acceptable for zero gravity environments. Furthermore, conventional tool changers do not lock tools down when not in use, nor do they provide a secure and fail safe hand-off of the tool from its parked or stowed position to an interface mechanism attached to the robot's wrist joint.

Accordingly, it is an object of the invention to provide an improvement in robotic tool changer mechanisms.

It is another object of the invention to provide an improvement in passive type tool changer mechanisms.

It is a further object to provide a tool change mechanism which performs a secure hand-off to and from the arm of a robot at any angle and in zero gravity environments.

It is still another object of the invention to provide a tool changing mechanism in which the hand-off operation may be interrupted or reversed at any time without any danger of the tool being unintentionally released or dropped.

And it is yet a further object of the invention to provide a tool changing mechanism which is designed so that it does not constrain the size and shape of the tool with which it is used.

SUMMARY

Briefly, the foregoing and other objects are achieved by a combination of three major elements, namely: a wrist interface plate which is secured to the wrist joint of a robotic arm; a tool interface plate which is secured to each tool which is intended for use by the robotic arm; and a tool stowage assembly or holster for each tool and interface plate intended for use to lock the tool down when it is not in use. The wrist interface plate and the tool interface plate are mutually connected together in use through an opening or recess in the upper face of the interface plate by means of a notched tongue protruding from the front face of the wrist interface plate which engages a pair of spring-biased rotatable notched wheels located within the body of the tool interface plate. The tool holster attaches and locks the tool interface plate to the wrist interface plate by means of a pair of actuation claws including a locking tab and an unlocking wedge which operate respective actuation bosses on each of the notched wheels in response to a forward and backward motion of the tool interface plate as a result of motion of the robotic arm.

BRIEF DESCRIPTION OF THE DRAWINGS

The following detailed description of the invention will be more readily understood when considered together with the accompanying drawings wherein:

FIG. 1 is a perspective view generally illustrative of the preferred embodiment of the invention;

DETAILED DESCRIPTION OF THE INVENTION

Figure 2A:
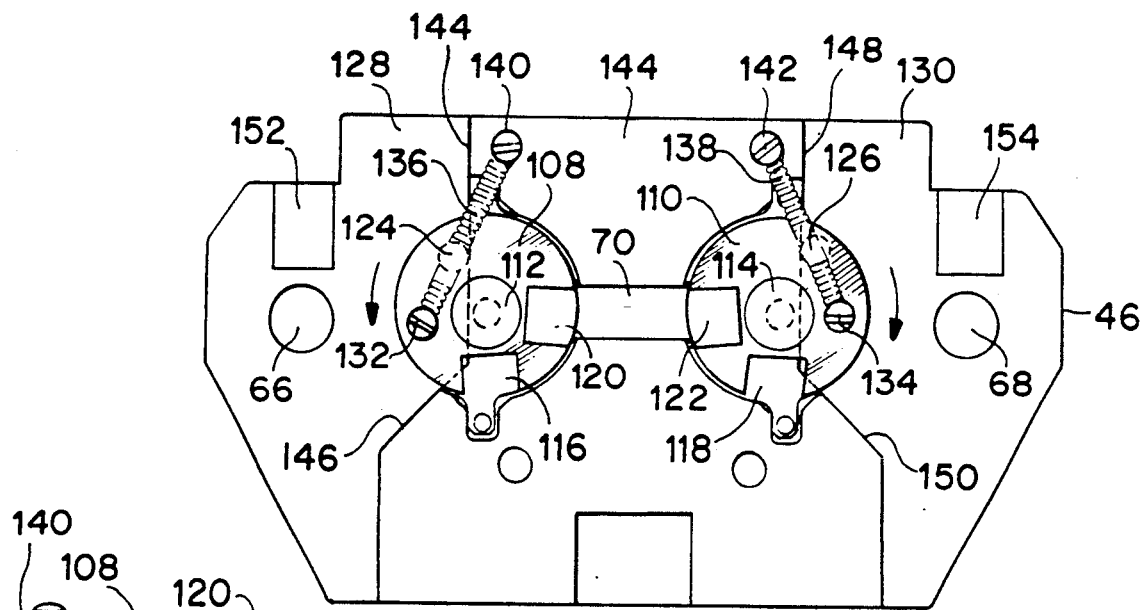
FIGS. 2A and 2B are sectional views of FIG. 1 taken along the lines 2—2 thereof and being illustrative of the operation of the tool interface plate shown thereat.

Referring now to the drawings wherein like reference numerals refer to like parts, FIG. is generally illustrative of the three principal components of the invention, and comprising a wrist interface plate 10 attached to the wrist joint assembly 12 of a robotic arm, not shown, a tool interface plate 14 attached to a robotic tool 16 and a tool stowage assembly 18 hereinafter referred to as a "holster".

While a single wrist joint assembly is utilized, there will be an individual tool interface plate 14 coupled to each tool 16 required for a particular task. Accordingly, each tool interface plate 14 will include a respective tool holster 18 where each individual tool 16 can be stowed or parked until needed.

The wrist interface plate 10 is comprised of a generally flat elongated plate 20 which is attached to an end plate or flange 22 located at the distal end of the wrist joint 12. Attachment is made via a plurality of screw holes 24. Protruding from the front or outer face 26 of the wrist interface plate 20 is a generally flat notched tongue member 28 having a chamfered or tapered end piece 30 and a pair of square notches or recesses 34 and 36 formed substantially midway along the length of the tongue's length.

The wrist interface plate 10 also includes a pair of outwardly projecting pin members 38 and 40, having rounded end portions and which are located at the outer extremities at either end of the elongated plate member 20. The two pins 38 and 40 act as unlocking pins for the tool interface plate 14 when it is held in a locked position on the holster 18, as will be explained subsequently. Additionally, the wrist interface plate 10 also includes an electrical connector member 42 which is adapted to make connection with a complementary electrical connector member 44 located on the tool interface plate 14.

Figure 3:
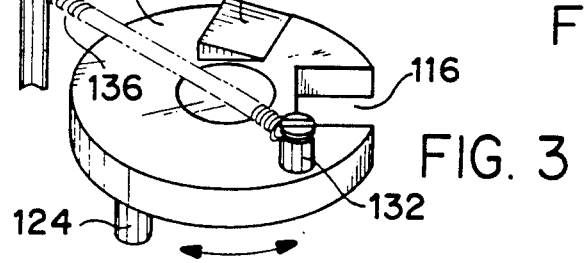
FIG. 3 is a perspective view of one of the rotatable notched wheels shown in FIGS. 2A and 2B.

Turning attention now to the tool interface plate 14, the details of which are shown in FIGS. 1-3, it is comprised of two substantially flat top and bottom plate members 46 and 48 which are attached together by means of a plurality of screws 50. The top plate member 46 is adapted to join together with the wrist interface plate 10, while the bottom plate 48 is adapted to be attached to a respective tool 16. Further as shown, the top surface 52 of the top plate member 46 includes a pair of raised strips or ridges 54 and 56 which are intended to contact a pair of complementary like sized raised strips 58 and 60 formed on the plate surface 26 of the wrist interface plate 10.

Outwardly of the raised strips 54 and 56 are a pair of detent ear portions 62 and 64 in which there is formed a pair of circular holes 66 and 68. The holes 66 and 68 are adapted to receive the two unlocking pins 38 and 40 of the wrist interface plate 10. Intermediate the raised strip portions 54 and 56, is a central recess or opening 70, including chamfered sidewalls 71, which is adapted to receive the notched tongue 28 protruding from the wrist interface plate 10.

Figure 4:
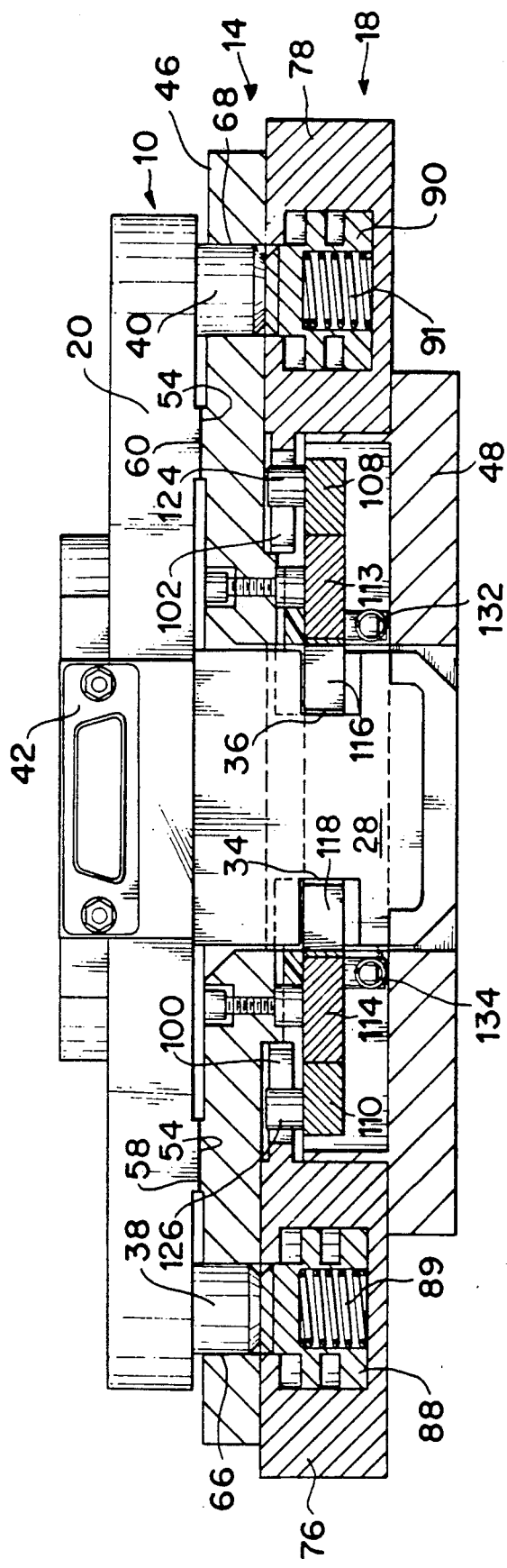
FIG. 4 is a front elevational view, partially in section, illustrating the operation of the notched tongue of the wrist interface plate being engaged by the rotatable notched wheels of the tool interface plate shown in FIGS. 2A and 3B.

Prior to considering the inner workings of the tool interface plate 14 as shown in FIGS. 2 and 3, the details of the tool holster 18 as shown in FIG. I will first be considered. The tool holster 18 is comprised of a generally flat U-shaped yoke 72 which is mounted on a base shown by reference numeral 74. The yoke 72 includes two forwardly extending arms 76 and 78 which have tapered forward end portions 80 and 82. The arms 76 and 78 additionally have pairs of stop members 84 and 86 in front of which are located a pair of spring loaded plungers 88 and 90 including respective detent type springs 89 and 91 (FIG. 4). The plungers 88 and 90 are adapted to engage the holes 66 and 68 of the tool interface plate 14. On each inside face 92 and 94 of the arms 76 and 78 adjacent the spring loaded plungers 88 and 90 are respective inwardly extending actuation claws 96 and 98, each consisting of an unlocking wedge section 100 and 102 and a locking tab section 104 and 106.

Figure 2B:
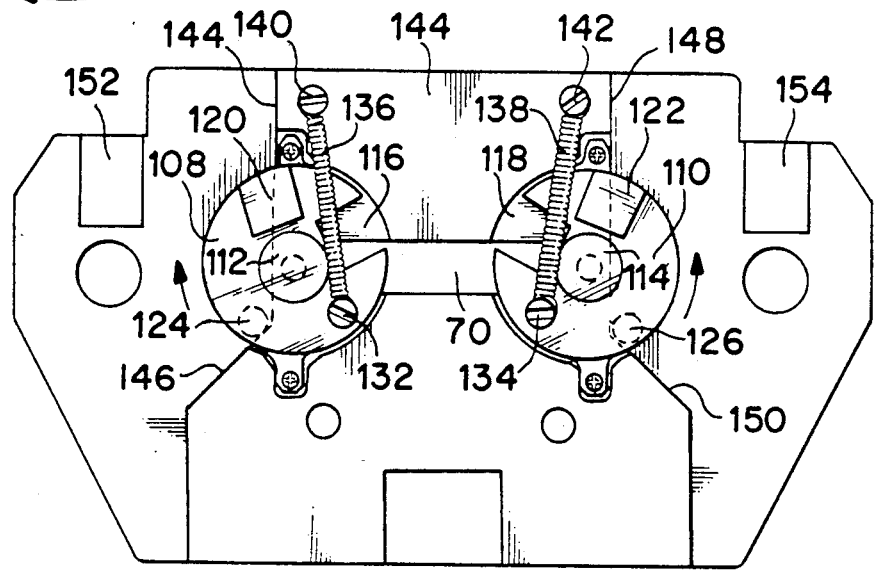

Reference will now be made collectively to FIGS. 2A, 2B and also to FIG. 4 which are intended to disclose the details of the mechanism whereby the tool interface plate 14 for a tool 16 is captured by the wrist interface plate 10 by virtue of the notched tongue member 28 shown in FIG. 1. On the underside of the top plate member 46 of the two plate assembly 14, there are located two notched wheels 108 and 110, one of which is further illustrated in FIG. 3. The notched wheels 108 and 110 are rotatable about respective pivots 112 and 114 such that one portion thereof including a respective notch 116 and 118 and an adjacent cam surface in the form of a wedge 120 and 122 are adapted to rotate into alignment with outer portions of the rectangular opening 70 in the plate 46. The opposite surfaces of the wheels 108 and 110 include outwardly extending actuation bosses 124 and 126, one of which is shown in FIG. 3, and which extends into a respective outer side channel 128 and 130 (FIG. 1) formed between the top and bottom plates 46 and 48 of the tool interface plate assembly 14. On the same side of the wheels 108 and 110 as the wedges 120 and 122, there is located a pair of spring bosses 132 and 134 which attach to respective over-center springs 136 and 138. The other ends of the springs are attached to bosses 140 and 142 secured to the inner surface of the plate 46 and which fit into recesses, not shown, formed in the lower plate 48.

The limits of rotation of the two notched wheels 108 and 110 are constrained, for example, by the actuation boss 124 abutting either of two raised adjacent edges 144 and 146 and for the actuation boss 126 by like raised adjacent edges 148 and 150. As shown in FIG. 2A, the actuation bosses 124 and 126 abut the edges 144 and 148 and illustrate a first end position where the wedges 120 and 122 are in substantial registration with the rectangular opening 70 and where the two notched wheels 108 and 110 can only rotate in a direction as shown by the arrows. FIG. 2B, on the other hand, is illustrative of the opposite end position where the actuation bosses 124 and 126 abut the edges 146 and 150, respectively, and wherein the notches 116 and 118 have rotated past registration with the opening 70 and thereafter can only rotate in the opposite direction from FIG. 2A as shown by the arrows. It can also be seen in FIGS. 2A and 2B that the springs 136 and 138 have alternated between two over-center positions with respect to the pivots 112 and 114. When the tool interface plate 14 is stowed on the tool holster assembly 14, the two notched wheels 108 and 110 will be rotated clockwise and counter clockwise, respectively, so that the notches 116 and 118 are in registration with the elongated edges of the opening 70 as will now be explained.

When a tool 16 is not being used, it is located in the tool holster assembly 18 by means of the tool interface plate 14. The arms 76 and 78 of the holster 18 fit into the grooves 128 and 130, configured in the sides of the tool interface plate 14. This holds the tool interface plate 14 and the tool 16 securely in all directions except for sliding in and out along the arms 76 and 78 as shown in FIG. 1. Sliding is prevented by the spring loaded detent plungers 88 and 90 which protrude from the arms 76 and 78 into the holes 66 and 68 in the detent ears 62 and 64 of the tool interface plate 14. When the robot, not shown, needs to acquire the tool 16, it positions the wrist joint 12 including the wrist interface plate 10 over the tool interface plate 14, with the notched tongue 28 directly over the chamfered recess 70 in the tool interface plate 14 and with the rounded locking pins 38 and 40 over the holes 66 and 68 in the detent ears 62 and 64.

With the wrist interface plate 10 vertically aligned with the tool interface plate 14, the wrist interface plate 10 is lowered until the notched tongue 28 is inserted into the recess 70 of the interface plate 14. The chamfered edges on both the tongue 28 and the recess 70, as shown in FIG. 1, aid in guiding the wrist interface plate 10 into the tool interface plate 14. In the holstered position of the tool interface plate 14, the notched wheels 108 and 110 have been rotated such that the respective notches 116 and 118 are aligned with the recess 70, thus forming a continuous rectangular channel for receiving the tongue 28.

As the robot continues to lower the wrist interface plate 10, the protruding locking pins 38 and 40 contact the holster's spring biased plungers 88 and 90 which pushes them down against the detent springs 89 and 91 as shown in FIG. 4. When the raised strips 58 and 60 of the wrist interface plate 10 contacts the raised strips 54 and 56 of the tool interface plate 14, three functions have occurred: (1) the electrical connector members 42 and 44 mate; (2) the notches 34 and 36 (FIG. 1) of the tongue 28 are at the same level as the rotatable notched wheels 108 and 110, thereby permitting the solid part of the wheels 108 and 110 to be rotated into the notches 34 and 36 for locking the tongue 28 in place; and (3) the detent spring plungers 88 and 90 are pushed down sufficiently so that the detent ears 62 and 64 can be slid off of the holster arms 76 and 78 as shown in FIG. 4. The projecting unlocking pins 38 and 40 remain in the holes 66 and 68. The tapered pins, moreover, are designed so as to have a close fit with the holes 66 and 68 so that a fine positioning accuracy is provided between the two interface plates 10 and 14. When the wrist interface plate has come in contact with the tool interface plate, the composite assembly can be slid sideways out of the holster 18 as shown in FIG. 1.

When the tool interface plate 14 is stowed and unused in the holster 18, the claws 96 and 98 contact the two actuation bosses 124 and 126 which extend into the channels 128 and 130 (FIG. 1) on the side of the tool interface plate 14 and are held between the respective unlocking wedges 100, 102 and locking tabs 104, 106, extending inwardly from the sides 92 and 94 of the holster plate 72. As the tool interface plate 14 is slid rearwardly out of the holster 18, the actuation bosses 124 and 126 are forced against the locking tabs 104 and 106. This causes a torque on both notched wheels 108 and 110, causing them to rotate in mutually opposite directions. As they rotate, the solid portions of the notched wheels 108 and 110 rotate into the notches 34 and 36 of the tongue 28. This prevents the tongue from being retracted or otherwise pulled out of the opening 70 in the tool interface plate 14. In the event either wheel 108 or 110 cannot be rotated into a notch 34 or 36 of the tongue 28, such as in the case of a misalignment, the particular actuation boss 124 or 126 will be prevented from moving by the claw 96, 98, with which it is in contact and results in the tool interface plate 14 from being slid out of the holster 18. Thus a safe hand-off of the tool 16 and the interface plate 14 from the holster assembly 18 to the robot and its wrist joint 12 occurs. This is a vital requirement for use in zero gravity environments such as outer space.

After the tool interface plate 14 has slid a short distance out of the holster 18, the over-center springs 136 and 138 rotate from a position similar to that shown in FIG. 2B to a position such as shown in FIG. 2A. This produces a continuing torque on the notched wheels 108 and 110, which continue to rotate until the wedges 120 and 122 are firmly wedged into the notches 34 and 36 of the tongue. The over-center springs 136 and 138 continue to exert pressure on their respective wedges 120 and 122 throughout its use mode as governed by the robot, thus insuring that the tool interface plate 14 does not come apart unexpectedly.

When there is a need to remove the tool 16 and the interface plate from the wrist joint 12, the foregoing sequence is simply reversed. The wrist joint 12 slides the tool interface plate 14 onto the holster arms 76 and 78, where a pair of ramps 152 and 154 formed on the forward undersurface of the detent ears 62 and 64, compress the holster detent springs 88 and 90. The unlocking wedge portions 100 and 102 of the claws 96 and 98 come in contact with the actuation bosses 124 and 126 of the notched wheels 108 and 110. This again produces a torque on the wheels 108 and 110. This is accompanied by a retraction of the wedges 120 and 122 from the notches 34 and 36 of the tongue 28. The over-center springs 136 and 138 stretch as the wheels 108 and 110 are rotated as shown in FIG. 2B to provide an added torque on the wheels 108 and 110 to align the notches 116 and 118 with the body of the tongue 28, allowing it to be removed from the opening 70. As the wrist interface plate 10 is moved up and away from the tool interface plate 14, the detent plungers 88 and 90 follow the unlocked pins 38 and 40 up into the holes 66 and 68, locking the tool interface plate 14 in place.

Such a configuration is designed such that only when the tool interface plate 14 is slid onto the holster a sufficient distance to align the detent plungers 88 and 90 with the holes 66 and 68 in the detent ears 62 and 64 do the notches 116 and 118 in the wheels 108 and 110 line up with the tongue 28, thus preventing the wrist interface plate 10 from being pulled out of the tool interface plate 14 without the tool interface plate 14 being locked in place on the holster 18.

With the wrist interface plate 10 removed from the tool interface plate 14, the electrical connector portions 42 and 44 are disconnected and the wrist interface plate is free to pick up another tool/interface plate combination.

The mechanism thus described is a passive structure in that it requires no actuators powered from the robot. This is an advantage in outer space, for example, where every actuator heretofore must be redundant and of highest quality, which meant that it was normally quite large, heavy and expensive. The simple design of the tool changer in accordance with this invention makes it easy to qualify for flight where vibration testing, thermal testing, etc. must be undergone. It furthermore has no electronics to verify and substantially only two major moving parts, i.e. the notched wheels 116 and 118.

The tool change mechanism in accordance with this invention, moreover, performs a secure hand-off of the tool from the holster to the arm and back again and can do so at any angle and in zero gravity environments. Furthermore, at any time during hand-off, the operation may be interrupted or reversed with no danger of releasing the tool. If power to the robotic arm is interrupted during a hand-off, there is no danger of the tool being released. It should also be noted that due to the sideways motion of the tool hand-off from the wrist joint to the holster, the size and shape of the tool is not constrained and no part of the holster protrudes up or down from the tool changer itself, leaving the space free for use in connection with large tools.

Having thus shown and described what is considered at present to be the preferred embodiment of the invention, it should be noted that the same has been made by way of illustration and not limitation. Accordingly, all modifications, alterations and changes coming within the spirit and scope of the invention as defined in the appended claims are herein meant to be included.

I claim:

1. Tool changer apparatus for a robotic system, comprising:
   first interface means attachable to a robotic arm;
   second interface means attachable to a tool to be used by the robotic arm;

stowage means, including actuation means, for receiving and holding said second interface means when the respective tool is not in use;

said first and second interface means further including means for mutually engaging each other in response to movement from and to said stowage means, said means for engaging each other comprising a member including at least one notch therein extending from one of said first and second interface means, and a recess and notch engaging member in the other of said first and second interface means, said notch engaging member being movable in and out of said at least one notch in response to operation by said actuation means of said stowage means;

said member including at least one notch comprises a tongue extending from said first interface means and wherein said recess and notch engaging means are located in said second interface means;

said first interface means comprises a wrist interface plate attachable to an outer end portion of the robotic arm and said second interface means comprises a tool interface plate fastened to said tool;

said stowage means comprises a holster in the form of a yoke member having bifurcated outwardly extending arms for engaging said tool interface plate, and said notch engaging means comprises a wheel rotatable in and out of said at least one notch of said tongue.

2. The tool changer apparatus of claim 1 wherein said tongue comprises a generally flat plate member including a pair of notches located in opposite side edges thereof.

3. The tool changer apparatus of claim 2 and wherein said notch engaging means further comprises a second wheel, said wheels comprise a pair of spring biased wheels located adjacent said recess and being respectively rotatable into the notches of said tongue by said actuation means of said holster.

4. The tool changer apparatus of claim 3 wherein said pair of wheels include peripheral edges which extend over said recess to respectively engage the pair of notches in said tongue, said wheels additionally including a respective notch matching the size of said recess, and being rotated by said actuation means to align said notches with said recess in a stowed position of said tool interface plate on said holster so as to receive said tongue of said wrist interface plate.

5. The tool changer of claim 4 wherein each of said wheels includes an actuation boss on one face thereof and wherein each arm of said holster includes an actuation claw for contacting a respective actuation boss.

6. The tool changer of claim 5 wherein each said actuation claw is located on an outer portion of a respective inner side surface of said arm of the holster and including a forwardly positioning locking tab having a front camming surface for engaging said actuation boss and rotating said notched wheel in a first direction and a rearwardly positioned unlocking wedge having a hook portion for engaging said actuation boss and rotating said notched wheel in a second direction.

7. The tool changer of claim 6 wherein said tool interface plate includes a pair of side channels through which a respective actuation boss projects, and wherein said side channels include contact surfaces for sliding on and off of said arms of the holster.

8. The tool changer of claim 5 wherein each of said wheels further includes a raised wedge type region adjacent a respective notch therein for engaging the tongue at each notch of said pair of notches.

9. The tool changer of claim 5 wherein each of said notched wheels are coupled to over center spring members for biasing between said wheels at two limiting end positions.

10. Tool changer apparatus for a robotic system, comprising:

first interface means attachable to a robotic arm;

second interface means attachable to a tool to be used by the robotic arm;

stowage means, including actuation means, for receiving and holding said second interface means when the respective tool is not in use;

said first and second interface means further including means for mutually engaging each other in response to movement from and to said stowage means, said means for engaging each other comprising a member including at least one notch therein extending from one of said first and second interface means, and a recess and notch engaging member in the other of said first and second interface means, said notch engaging member being movable in and out of said at least one notch in response to operation by said actuation means of said stowage means;

said member including at least one notch comprises a tongue extending from said first interface means and wherein said recess and notch engaging means are located in said second interface means;

said first interface means comprises a wrist interface plate attachable to an outer end portion of the robotic arm and said second interface means comprises a tool interface plate fastened to said tool;

said stowage means comprises a holster in the form of a yoke member having bifurcated outwardly extending arms for engaging said tool interface plate, and said holster includes means for locking said tool interface plate in position thereon and where said wrist interface plate includes means for unlocking said tool interface plate therefrom to permit the removal of said tool interface plate from said holster.

11. The tool changer of claim 10 wherein said locking means comprises an upwardly biased plunger member located on the forward portion of each arm of said holster, said tool interface plate additionally including a pair of outwardly extending ear type members, each having a bore therein for receiving a respective plunger member when in a stowed position on said holster.

12. The tool changer of claim 11 wherein said wrist interface plate includes a pair of plunger member depression means, one on each outer end portion of said wrist interface for depressing said plunger member through the bores in the tool interface plate so that the tool interface plate can be slid from the arms of the holster.

13. The tool changer of claim 12 wherein said depression means comprise a pair of rounded end pin type members projecting from an outer face of said wrist interface plate.

14. The tool changer of claim 13 wherein said tongue is located between said pair of pin type members.

* * * * *